United States Patent
Ambichl et al.

(10) Patent No.: US 8,543,984 B2
(45) Date of Patent: Sep. 24, 2013

(54) ARCHITECTURE FOR STATE DRIVEN TESTING

(75) Inventors: Ernst Ambichl, Altenberg (AT); Dietmar Strasser, Weisskirchen/Traun (AT)

(73) Assignee: Micro Focus (US), Inc., Rockville, MD (US)

( * ) Notice: Subject to any disclaimer, the term of this patent is extended or adjusted under 35 U.S.C. 154(b) by 117 days.

(21) Appl. No.: 12/890,547

(22) Filed: Sep. 24, 2010

(65) Prior Publication Data

US 2012/0047490 A1 Feb. 23, 2012

Related U.S. Application Data

(63) Continuation of application No. 12/861,794, filed on Aug. 23, 2010, and a continuation of application No. 12/861,801, filed on Aug. 23, 2010.

(51) Int. Cl.
*G06F 9/44* (2006.01)

(52) U.S. Cl.
USPC ........... 717/125; 717/124; 717/100; 717/118; 717/134; 717/129

(58) Field of Classification Search
USPC ................. 717/125, 124, 126, 114, 134, 118, 717/129, 100
See application file for complete search history.

(56) References Cited

U.S. PATENT DOCUMENTS

| | | | |
|---|---|---|---|
| 5,754,760 A | 5/1998 | Warfield | |
| 6,026,401 A * | 2/2000 | Brealey et al. | 1/1 |
| 6,212,573 B1 | 4/2001 | Lim et al. | |
| 6,336,215 B1 | 1/2002 | Oberhauser et al. | |
| 6,467,078 B1 | 10/2002 | Matsuba et al. | |
| 6,907,546 B1 | 6/2005 | Haswell et al. | |
| 7,051,330 B1 | 5/2006 | Kaler et al. | |
| 7,523,425 B2 * | 4/2009 | Bunin et al. | 716/107 |
| 7,685,576 B2 | 3/2010 | Hartmann et al. | |
| 7,895,565 B1 * | 2/2011 | Hudgons et al. | 717/106 |
| 2003/0135844 A1 * | 7/2003 | Yellin et al. | 717/126 |
| 2004/0103396 A1 * | 5/2004 | Nehab | 717/127 |
| 2005/0108710 A1 | 5/2005 | Patiejunas | |
| 2006/0085681 A1 * | 4/2006 | Feldstein et al. | 714/25 |
| 2006/0230410 A1 | 10/2006 | Kurganov et al. | |
| 2007/0168986 A1 * | 7/2007 | Pangburn | 717/124 |
| 2007/0240118 A1 | 10/2007 | Keren | |
| 2010/0318974 A1 * | 12/2010 | Hrastnik et al. | 717/135 |
| 2011/0088011 A1 | 4/2011 | Ouali | |

(Continued)

OTHER PUBLICATIONS

U.S. Appl. No. 12/861,794.

(Continued)

*Primary Examiner* — Vanel Frenel
(74) *Attorney, Agent, or Firm* — DLA Piper LLP US

(57) ABSTRACT

An architecture for a test script editor that can be used by anybody in the development team, including non-programmer business analyst testers. Software testers can generate test scripts for validating and verifying software without navigating all possible actions or keywords. The current application state is described with one or more test objects. Each test object has one or more associated test methods and each test method can describe one or more state transitions. Only test methods accessible through test objects in the current application state are displayed to the software tester. The current state changes only if the state transition described by the test method selected by the software tester indicates a change from the current state.

15 Claims, 27 Drawing Sheets

(56) References Cited

U.S. PATENT DOCUMENTS

2011/0239198 A1 9/2011 Sweis
2011/0246540 A1* 10/2011 Salman et al. ................ 707/812
2012/0047487 A1 2/2012 Ambichl et al.
2012/0047488 A1 2/2012 Ambichl et al.

OTHER PUBLICATIONS

U.S. Appl. No. 12/861,801.

* cited by examiner

```
TestObjectList getAccessibleTestObjects(StateStack stack, TestStep[] script,
                                        int firstStep, int lastStep)
{
  for (int i=firstStep; i<=lastStep; i++) // for all steps of a test script
  {
    TestStep step = script[i];
    TestObject to = step.getTestObject();
    TestMethod tm = step.getTestMethod();

// Retrieve the list of state transitions which are defined for the test
    // method in the test framework
    StateTransitionList stList =
        GetStateTransitionList(TestFramework, to, tm);

// for all StateTransitions st in StateTransitionList
    for (StateTransition st : stList)
    {
      if (st.type==RestoreAppState) {                    ~ 310
        stack.pop();
      }
      if (st.type==SetAppState) {          ~ 320
        stack.pop();
        stack.push(st.testObjects);
      }                                        ~ 330
      if (st.type==AddAppState) {
        TestObjectList testObjects=stack.pop();
        testObjects.add(st.testObjects);
        stack.push(testObjects);              ~ 340
      }
      if (st.type==RemoveAppState) {
        TestObjectList testObjects=stack.pop();
        testObjects.remove(st.testObjects);
        stack.push(testObjects);
      }                                        ~ 350
      if (st.type==NewAppState) {
        stack.push(st.testObjects);
      }
    }
  }
  return stack.pop();
}
```

Script | testCase 1

| No. | Test Object | Test Method | Parameter 1 | Parameter 2 | Parameter 3 | Parameter 4 | Return |
|---|---|---|---|---|---|---|---|
| 1 | Start | setUserNameAndPassword | user | pwd | | | |
| 2 | Start | selectOk | | | | | Main |
| 3 | Main | selectA | | | | | AGrid |
| 4 | AGrid | selectRow | 1 | | | | AAction |
| 5 | AAction | selectEdit | | | | | AEditDialog |
| 6 | AEditDialog | setColumn1 | hello | | | | |
| 7 | AEditDialog | selectOkAndGotoB | | | | | BGrid |
| 8 | Main | selectLogout | | | | | Start |

Command

1005

[Append] [Delete Last] [Insert] [Delete] [Locate]

```
                    1210
                  ~/
StartObject Start
     TestMethod setUserNameAndPassword(String username, String password)
     TestMethod selectCancel()
     TestMethod selectOk() Returns Main
          StateTransition SetAppState(Main)

TestObject Main
     TestMethod selectA() Returns AGrid
          StateTransition SetAppState(Main,AGrid)
     TestMethod selectB() Returns BGrid
          StateTransition SetAppState(Main,BGrid)
     TestMethod selectLogout() Returns Start
          StateTransition SetAppState(Start)

TestObject AGrid
     TestMethod selectRow(Integer rowIndex) Returns AAction
          StateTransition AddAppState(AAction)
     ...
                      ~~1220
TestObject AAction
     TestMethod selectEdit() Returns AEditDialog
          StateTransition NewAppState(AEditDialog)
     ...

TestObject AEditDialog
     TestMethod setColumn1(String value)
     TestMethod setColumn2(String value)
     TestMethod setColumn3(String value)
     TestMethod selectOk()
          StateTransition RestoreAppState
     TestMethod selectCancel()
          StateTransition RestoreAppState
     TestMethod selectOkAndGotoB() Returns BGrid
          StateTransition        ~~1230
               RestoreAppState,
               RemoveAppState(AAction,AGrid),
               AddAppState(BGrid)
```

FIG. 12A  1200

```
@StartObject
public class Start {
  public void setUserNameAndPassword (String username, String password) {
    // Implementation Code of Test Method setUserNameAndPassword }
  public void selectCancel()
     // Implementation Code of Test Method selectCancel }
  @SetAppState(Main.class)
  public void selectOk() {
    // Implementation Code of Test Method selectOk }
}
public class Main {
  @SetAppState({Main.class,AGrid.class})
  public void selectA() {
    // Implementation Code of Test Method }
  @SetAppState({Main.class,BGrid.class})
  public void selectB() {
    // Implementation Code of Test Method }
  @SetAppState(Start.class)
  public void selectLogout() {
    // Implementation Code of Test Method }
}
public class AGrid {
  @AddAppState(AAction.class)
  public void selectRow(int rowIndex) {
    // Implementation Code of Test Method }
  ...
}
public class AAction {
  @NewAppState(AEditDialog.class)
  public void selectEdit() {
    // Implementation Code of Test Method }
  ...
}
public class AEditDialog {
  public void setColumn1(String value) {
    // Implementation Code of Test Method }
  public void setColumn2(String value) {
    // Implementation Code of Test Method }
  public void setColumn3(String value) {
    // Implementation Code of Test Method }
  @RestoreAppState
  public void selectOk() {
    // Implementation Code of Test Method }
  @RestoreAppState
  public void selectCancel() {
    // Implementation Code of Test Method }
  @RestoreAppState
  @RemoveAppState({AAction.class,AGrid.class})
  @AddAppState(BGrid.class)
  public void selectOkAndGotoB() {
    // Implementation Code of Test Method }
  ...
}
```

FIG. 12B 1240

```
[StartObject]
public class Start {
  public void setUserNameAndPassword (String username, String password) {
    // Implementation Code of Test Method setUserNameAndPassword }
  public void selectCancel() {
      // Implementation Code of Test Method selectCancel }
  [SetAppState(Main.class)]
  public void selectOk() {
    // Implementation Code of Test Method selectOk }
}
public class Main {
  [SetAppState(typeof(Main), typeof(AGrid))]
  public void selectA() {
    // Implementation Code of Test Method }
  [SetAppState(typeof(Main), typeof(BGrid)]
  public void selectB() {
    // Implementation Code of Test Method }
  [SetAppState(typeof(Start)]
  public void selectLogout() {
    // Implementation Code of Test Method }
}
public class AGrid {
  [AddAppState(typeof(AAction)]
  public void selectRow(int rowIndex) {
    // Implementation Code of Test Method }
    ...
}
public class AAction {
  [NewAppState(typeof(AEditDialog)]
  public void selectEdit() {
    // Implementation Code of Test Method }
    ...
}
public class AEditDialog {
  public void setColumn1(String value) {
    // Implementation Code of Test Method }
  public void setColumn2(String value) {
    // Implementation Code of Test Method }
  public void setColumn3(String value) {
    // Implementation Code of Test Method }
  [RestoreAppState]
  public void selectOk() {
    // Implementation Code of Test Method }
  [RestoreAppState]
  public void selectCancel() {
    // Implementation Code of Test Method }
  [RestoreAppState]
  [RemoveAppState(typeof(AAction, typeof(AGrid)]
  [AddAppState(typeof(BGrid)]
  public void selectOkAndGotoB () {
    // Implementation Code of Test Method }
    ...
}
```

FIG. 12C 1250

```xml
<StartObject name="Start">
  <TestMethod name="setUserNameAndPassword">
    <Parameters>
      <Parameter name="username" />
      <Parameter name="password" />
    </Parameters>
  </TestMethod>
  <TestMethod name="selectCancel" />
  <TestMethod name="selectOk">
    <StateTransitions>
      <SetAppState testObjectList="Main" />
    </StateTransitions>
  </TestMethod>
</StartObject>

<TestObject name="Main">
  <TestMethod name="selectA">
    <StateTransitions>
      <SetAppState testObjectList="Main,AGrid" />
    </StateTransitions>
  </TestMethod>

<TestMethod name="selectB">
    <StateTransitions>
      <SetAppState testObjectList="Main,BGrid" />
    </StateTransitions>
  </TestMethod>
  <TestMethod name="selectLogout">
    <StateTransitions>
      <SetAppState testObjectList="Start" />
    </StateTransitions>
  </TestMethod>
</TestObject>

<TestObject name="AGrid">
  <TestMethod name="selectRow">
    <Parameters>
      <Parameter name="rowIndex" />
    </Parameters>
    <StateTransitions>
      <AddAppState testObjectList="AAction" />
    </StateTransitions>
  </TestMethod>
  ...
</TestObject>

<TestObject name="AAction">
  <TestMethod name="selectEdit">
    <StateTransitions>
      <NewAppState testObjectList="AEditDialog" />
    </StateTransitions>
  </TestMethod>
  ...
</TestObject>
```

FIG. 12D 1260

```xml
<TestObject name="AEditDialog">
  <TestMethod name="setColumn1">
    <Parameters>
      <Parameter name="value" />
    </Parameters>
  </TestMethod>

<TestMethod name="setColumn2">
    <Parameters>
      <Parameter name="value" />
    </Parameters>
  </TestMethod>

<TestMethod name="setColumn3">
    <Parameters>
      <Parameter name="value" />
    </Parameters>
  </TestMethod>

<TestMethod name="selectOk">
    <StateTransitions>
      <RestoreAppState/>
    </StateTransitions>
  </TestMethod>

<TestMethod name="selectCancel">
    <StateTransitions>
      <RestoreAppState/>
    </StateTransitions>
  </TestMethod>

<TestMethod name="selectOkAndGotoB">
    <StateTransitions>
      <RestoreAppState/>
      <RemoveAppState testObjectList="AAction,AGrid" />
      <AddAppState testObjectList="BGrid" />
    </StateTransition>
  </TestMethod>

...
</TestObject>
```

FIG. 12E 1261

ARCHITECTURE FOR STATE DRIVEN TESTING

CROSS-REFERENCE TO RELATED APPLICATIONS

This application is a continuation of prior application Ser. No. 12/861,794, filed Aug. 23, 2010, and entitled "State Driven Testing," and a continuation of application Ser. No. 12/861,801, filed Aug. 23, 2010, and entitled "State Driven Test Editor," both of which are hereby incorporated by reference in its entirety for all purposes.

FIELD

The present invention relates generally to software, More specifically, the present invention relates to automated testing.

BACKGROUND

Testing is a critical component in the development of software. Testing is the process of validating and verifying that a software program, application, or product meets the business and technical requirements that guided its design and development, works as expected, and can be implemented with the same characteristics.

Some software development tools help automate testing by recording tests that are run, allowing "playback" of the test routines. However, an entire test routine is rarely, if ever, applicable to more than one release of one application. Data-driven testing adds some modularity by keeping test input and output values separate from the test procedure, but the procedure itself is still in a single script. Keyword-driven testing breaks the test procedure into logical components that can then be used repeatedly in the assembly of new test scripts. Keyword driven testing separated much of the programming work of test automation from the actual test design, allowing tests to be developed earlier and making the tests easier to maintain.

Tools such as keyword driven testing allows such business analysts earlier in the testing process. Every software product has a target audience. For example, the audience for video game software is completely different from banking software. An organization's business analysts may have a deep understanding of the target audience, but very little programming knowledge.

Keyword driven testing is useful, but applications can easily require thousands of automation keywords to be developed and used. Navigating, constructing and maintaining test scripts based on thousands of keywords are cumbersome.

Computer scientists attempt to keep track of the behavior of systems through tools such as state diagrams. However, state diagrams require the creation of distinct nodes for every valid combination of parameters that define the state, leading to a very large number of nodes and transitions between nodes for all but the simplest of systems (the "state and transition explosion problem"). While UML state diagrams and Harel state charts try to solve the state and transition explosion problem by providing complex formalisms like hierarchical nested states, orthogonal regions, entry and exit actions, and internal transitions, their complexity is inappropriate for the problem of modeling test script navigation for graphical user interface ("GUI") applications. Even with advanced state diagrams and state charts, it remains cumbersome to understand the interrelationship as well as to maintain changes in the framework from both a structuring as well as a navigation aspect.

There are continuing efforts to improve automated testing.

BRIEF DESCRIPTION OF THE DRAWINGS

The present invention will be readily understood by the following detailed description in conjunction with the accompanying drawings. Like reference numerals designate like structural elements, Although the drawings depict various examples of the invention, the invention is not limited by the depicted examples. Furthermore, the depictions are not necessarily to scale.

FIG. 3 illustrates an exemplary algorithm for calculating the application state using Java-like pseudo-code for determining which test objects are accessible when appending an action at the end of a sequence of actions;

FIG. 9A through 9H illustrate the exemplary test script editor of FIG. 1 creating a test script for the exemplary application described in FIGS. 7A-7F and 8;

FIG. 11 illustrates the exemplary test script editor of FIG. 1 when steps four through six are selected;

FIG. 12A through 12E illustrate exemplary notations for a test framework using the exemplary system under test of FIGS. 7A-7F;

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. In other examples, the described techniques may be varied in design, architecture, code structure, or other aspects and are not limited to any of the examples provided. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

State driven testing identifies state transitions of user interface ("UI") objects such that the set of allowed UI actions (e.g., keywords) at a specific point in a test script can be minimized. Instead of presenting the tester with all available keywords, only those keywords available at a specific point in navigation are accessible to the user. The limited keywords allows for the rapid development and maintenance of test cases through tools such as a test case editor.

Figure 1:
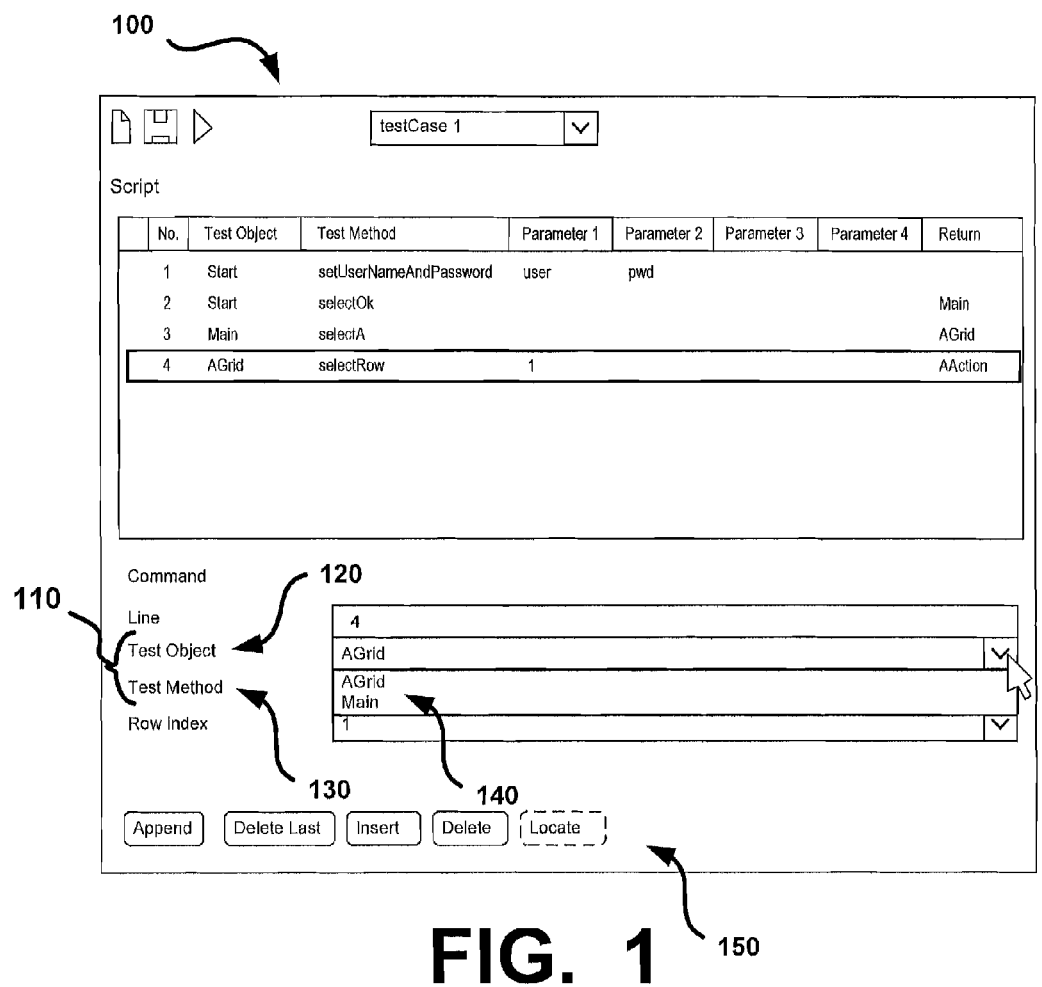
FIG. 1 illustrates an exemplary test script editor that creates test scripts.

FIG. 1 illustrates an exemplary test script editor 100 that creates and modifies test scripts. The test script editor 100 enables the building of maintainable and stable test scripts by selecting from a set of accessible actions 110. Actions 110 are a combination of test objects 120 and test methods 130. The availability of any action (e.g., available test objects 140) is based on the specific point in navigation. The test script editor 100 may also further provide context sensitive navigation help 150 for appending steps at the end of the script, inserting steps within the script, changing existing steps and deleting steps.

A test method 130 represents an action against the system under test ("SUT") like entering data, verifying response data and navigating in the application. A test object 120 is typically used to structure the test framework so that all available actions are represented for a specific UI container of the SUT (e.g, dialog, tree-view, data-grid, pane, frame, or menu).

Figure 2:
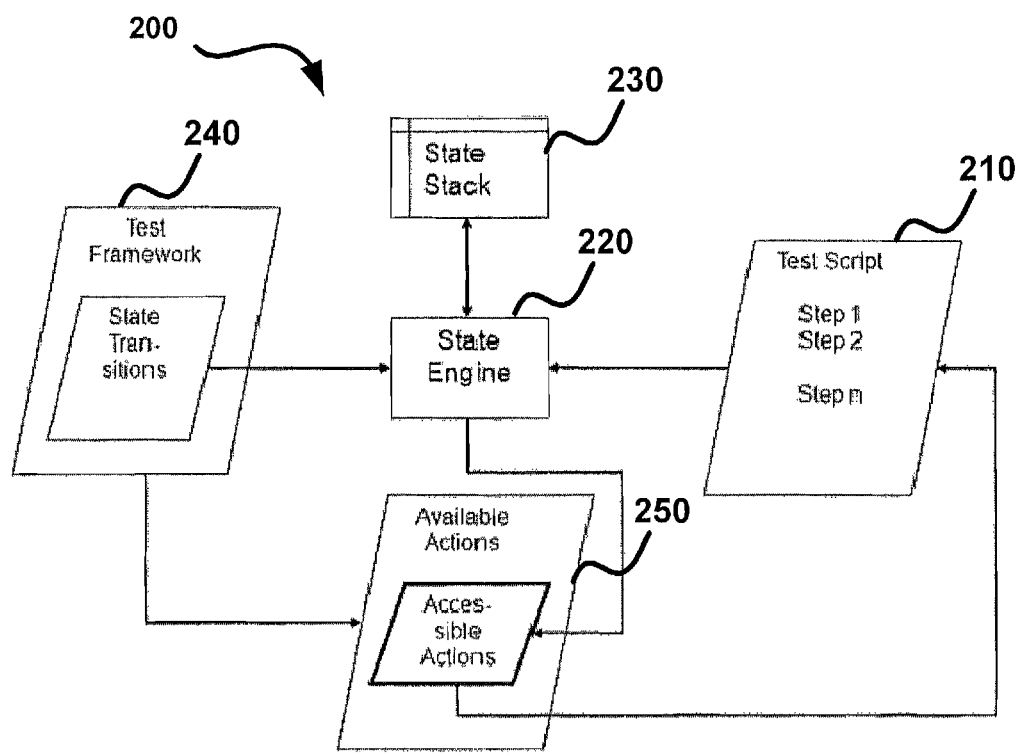
FIG. 2 illustrates a diagram 200 of the various components of a state driven testing system and their relationships to each other.

FIG. 2 illustrates a diagram 200 of the various components of a state driven testing system and their relationships to each other. The diagram 200 indicates the interactions between the test script 210, the application state engine 220, the application state stack 230, the test framework 240, and the available actions 250. The test script 210 is the sequence of test steps or actions to be taken against the SUT.

Accessible actions are calculated by the state engine 220, which calculates all state transitions of preceding actions and, preferably, subsequent actions in the script. The state engine 210 can preferably determine (A) which test objects are accessible when appending an action at the end of a sequence of actions, (B) which test objects and test methods are accessible when inserting an action within a sequence of actions, (C) which test objects and test methods can be changed for an existing test script step while maintaining the integrity of the test script, i.e., without breaking state transitions for succeeding actions, and (D) which consecutive sequence of actions can be deleted from a sequence of actions without breaking state transitions. A broken state transition causes actions that are not reachable through the state transitions of the predecessor actions and violates the integrity of the test script.

The application state stack 230 allows application states to be easily re-established to former application states by providing a mechanism to maintain multiple application states (e.g., a last in, first out (LIFO) stack). An application state stack 230 is useful, among other things, in scenarios where a former application state needs to be preserved. A modal dialog is one example of when it would be desirable to preserve the application state and introduce a new application state that only covers actions available inside the modal dialog. In user interface design, a modal dialog is a child window that requires users to interact with it before they can return to operating the parent application thus preventing the workflow on the application main window (e.g., age verification, password entry, file name selection). After closing the modal dialog it is usually desirable to re-establish the application state of the application that existed before opening the modal dialog.

In computer science the behavior of a system is a function of (a) the execution instructions, (b) the input and (c) the current state. A state is traditionally defined as a unique configuration of information in a program or machine, For a SUT, the application state can be defined by the sequence of all prior state transitions and can be represented by the list of available test objects 140 that are accessible at a specific position in the test script 210. A state transition can be associated with a test method 130 and defines the accessible test objects 140 after executing the test method 130. Multiple state transition methods can be used to change the application state. Additionally, if the accessible test objects 140 of a test method 130 (the test method's state transition) is the same as the current state, then no change in application state will occur.

The test framework 240 represents the collection of all test objects 120 and associated test methods 130 (shown in FIG. 1) including the state transitions, which describes all possible navigation in the SUT.

FIG. 3 illustrates an exemplary algorithm 300 using Java-like pseudo-code for determining which test objects are accessible at a certain position of the test script. State transition methods such as RestoreAppState 310, SetAppState 320, AddAppState 330, RemoveAppState 340 and NewAppState 350, are indicated as being used to change the application state stack. NewAppState 350 is described in connection with FIG. 4B, RestoreAppState 310 is described in connection with FIG. 4C, SetAppState 320 is described in connection with FIG. 4D, AddAppState 330 is described in connection with FIG. 4E and RemoveAppState 340 is described in connection with FIG. 4F.

Figure 4A:
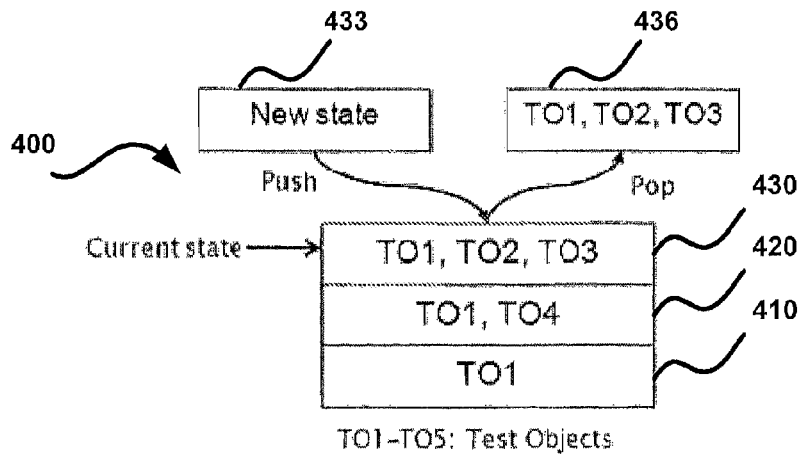
FIG. 4A is an exemplary application state stack with low level state stack methods.

FIG. 4A illustrates an exemplary application state stack 400 with low level state stack methods ("push" and "pop"). An application state 410, 420, 430 represents the set of test objects that are accessible at a specific position in the test script. The application start state 410 is a special application state represented by the set of test objects that are used to describe the user's first possible interactions. Any given application state is defined by the sequence of state transitions defined for preceding test script lines (actions) starting from the application start state 410, including the current application state 430, and all intermediate application states 420. The "New state" box 433 with the basic stack function "Push" is used to illustrate how to add a new state at the top of the state stack (=current state). The "TO1, TO2, TO3" box 436 with the basic stack function "Pop" is used to illustrate how to remove the current state from the state stack.

Figure 4B:
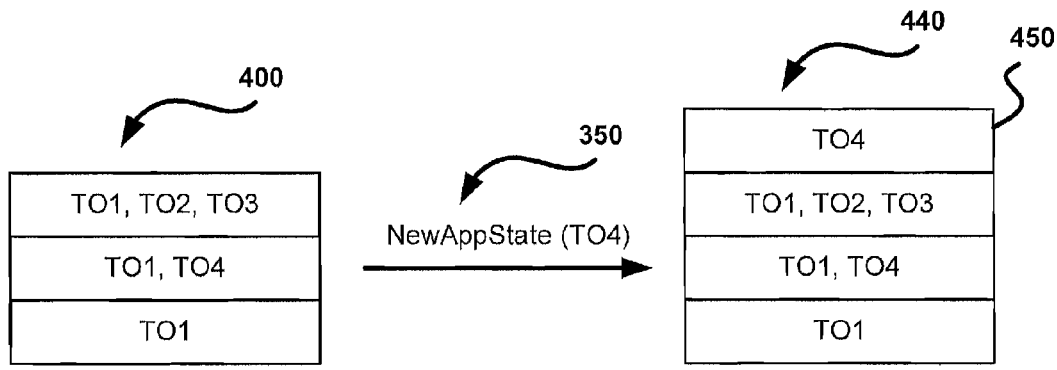
FIGS. 4B through 4F illustrate an exemplary application state stack after some navigation has occurred and certain sequence of actions are taken.

The exemplary application state stack 400 can be acted upon by the state engine 220 using the algorithm 300. FIG. 4B illustrates the exemplary application state stack 440 after the NewAppState 350 transition method with an input of TO4 is applied. The transition method NewAppState 350 saves the current application state 430 on the application state stack 440 and sets the current state to the newly created state 450. In other words, the first set of states (TO1, TO2, TO3) ceases being the current state and the second set of states (TO4) becomes the new current state.

Figure 4C:
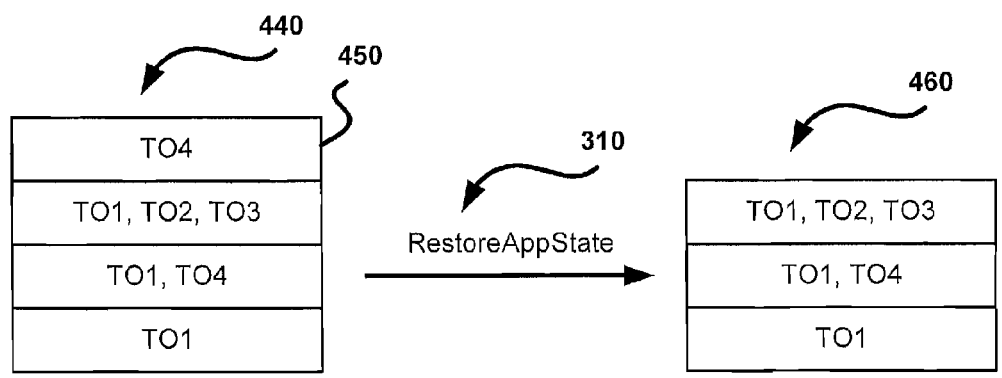

FIG. 4C illustrates the exemplary application state stack 460 after the RestoreAppState 310 transition method is applied. The transition method RestoreAppState 310 removes the existing application state 450 from the application state stack 440, resulting in an application state stack 460 identical to the application state stack 400 prior to the NewAppState 350 transition method being applied.

Figure 4D:
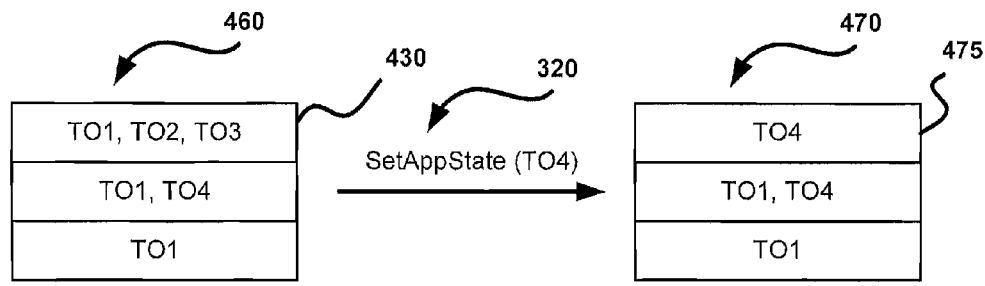

FIG. 4D illustrates the exemplary application state stack 470 after the SetAppState 320 transition method with an input of TO4 is applied. The transition method SetAppState 320 sets the current application state 475 to the list of test objects provided as input, removing former test objects of the prior current state 430.

Figure 4E:
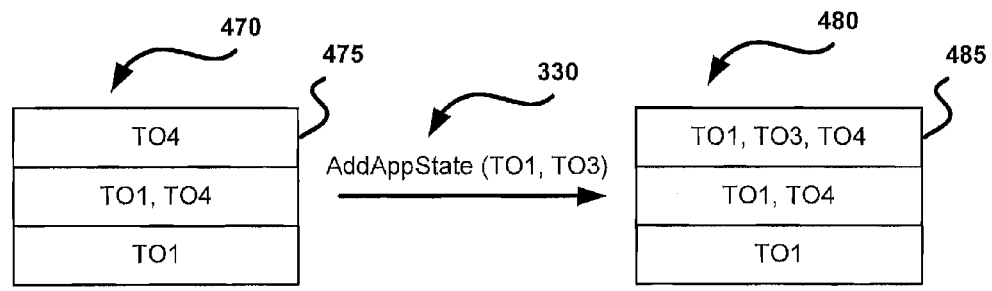

FIG. 4E illustrates the exemplary application state stack 480 after the AddAppState 330 transition method with an input of TO1 and TO3 is applied. The transition method AddAppState 330 adds the list of test objects provided as input to the current application state 485 while retaining the set of test objects of the former state 475.

Figure 4F:
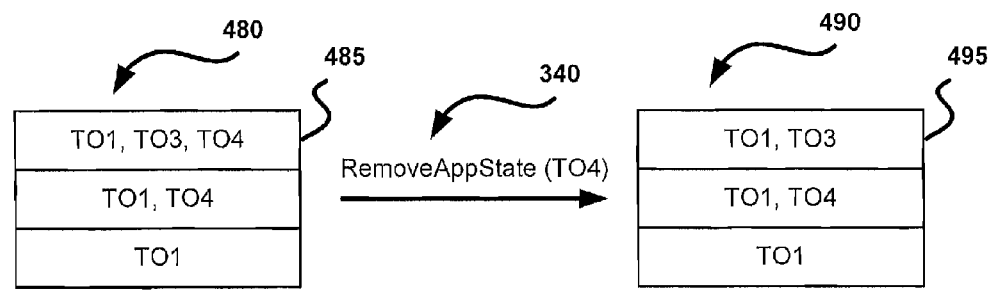

FIG. 4F illustrates the exemplary application state stack 490 after the RemoveAppState 340 transition method with an input of TO4 is applied. The transition method RemoveAppState 340 removes from the former state 485 the list of test objects provided as input from the current application state 495.

Figure 5:
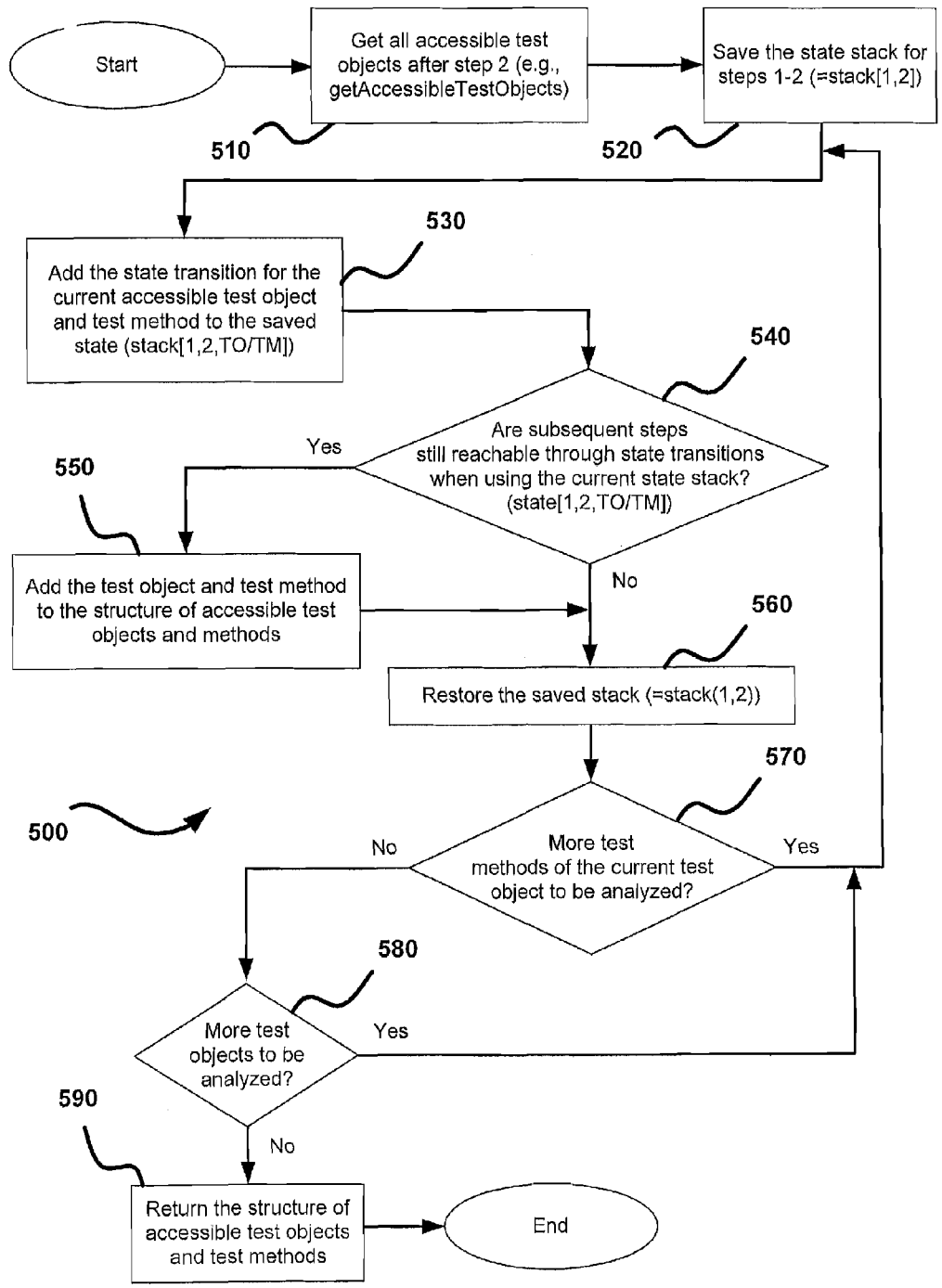
FIG. 5 illustrates an exemplary flowchart for determining which test objects are accessible when inserting an action within a sequence of actions.

FIG. 5 illustrates an exemplary flowchart 500 for determining which test objects are accessible when inserting an action within a sequence of actions. The exemplary algorithm 500 assumes a five step test script 210 with an action inserted after the second step. The output of the exemplary flowchart 500 is a test script describing the structure of accessible test objects and test methods.

In block 510 all accessible test objects after the insertion point (i.e., step 2) are retrieved. In a preferred embodiment, algorithm 300 may be used to for block 510. In block 520, the state stack prior to the insertion point is saved. Block 530 then begins the decision tree that occurs for each of the returned test objects. In block 530 the state transition for the test object and test method under analysis is added to the saved stack. In block 540 a check is made whether the subsequent steps (i.e., steps three through five) are still reachable through state transitions when using the current state stack. Subsequent steps are reachable if the test object of the step is part of the accessible test objects for the application state. If the subsequent steps are reachable, then in block 550 the test object and test method is added to the structure of accessible test objects and methods. In block 560 the saved stack is then restored. Block 570 ensures the process is repeated for each test method of the current test object. Similarly, block 580 ensures the process is repeated for each test object. Block 590 returns the structure of accessible test objects and test methods, completing the algorithm 500.

The algorithm of FIG. 5 can similarly be used to determine which test objects are accessible when changing an action within a sequence of actions. Assuming the step to be modified is the third step of the test script 210, the same algorithm can be used except that in block 540 the subsequent steps that need to be checked for reachability are only steps four and five since step three is the step being changed.

Figure 6:
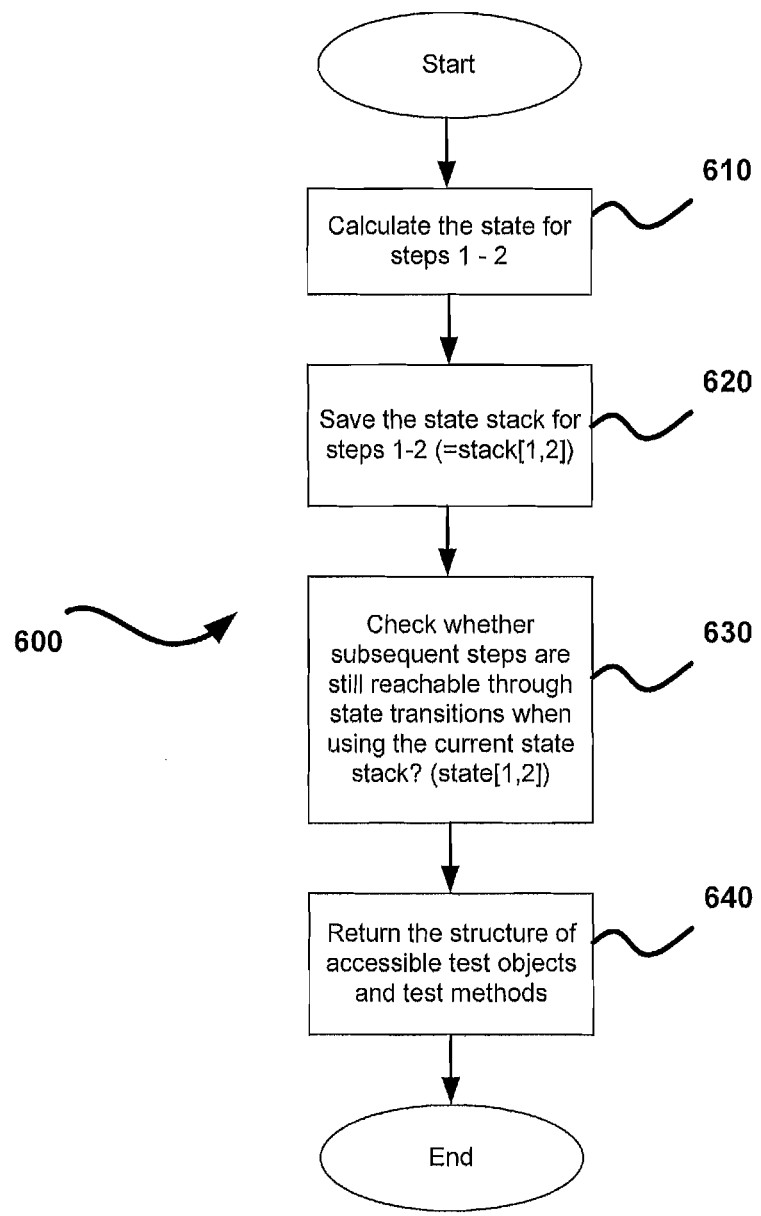
FIG. 6 illustrates an exemplary flowchart for determining whether an action or a consecutive sequence of actions can be deleted from a test script without breaking state transitions.

FIG. 6 illustrates an exemplary flowchart 600 for determining whether an action or a consecutive sequence of actions can be deleted from a test script 210 without breaking state transitions. The exemplary algorithm 600 assumes the deleted action(s) start with step 3. The output of the exemplary flowchart 600 is a test script describing the structure of accessible test objects and test methods.

In block 610 the state engine 220 calculates the state for the steps preceding the deletion point (i.e., steps one and two). In block 620 the state stack prior to the deletion point is saved. Block 620 may have an implementation that is similar to block 520 in FIG. 5. In step 630 a check is made whether steps subsequent to the deleted steps are still reachable through state transitions when using the current state stack. For example, if steps three and four are being deleted, and the test script 210 is only five steps long, then only step five needs to be checked for reachability. In block 640 the accessible test objects and test methods are returned. Block 640 may have an implementation that is similar to block 590 in FIG. 5. If no subsequent steps are reachable, then only the saved state stack (i.e., steps one and two) would be returned.

As described herein, state transitions are associated with test methods and define how the accessible test objects potentially change after executing the test method. However, in an alternative approach of application state management state transitions can be defined through changes of accessible test methods instead of changes of accessible test objects. This alternative approach, however, may become cumbersome for a SUT that offers hundreds to thousands test methods. By defining a state transition on the test object level, state management loses some accuracy by not exactly defining which test methods of a test object are accessible, but gains practicability as users only need to define which test objects are accessible after executing a test method.

Figure 7A:
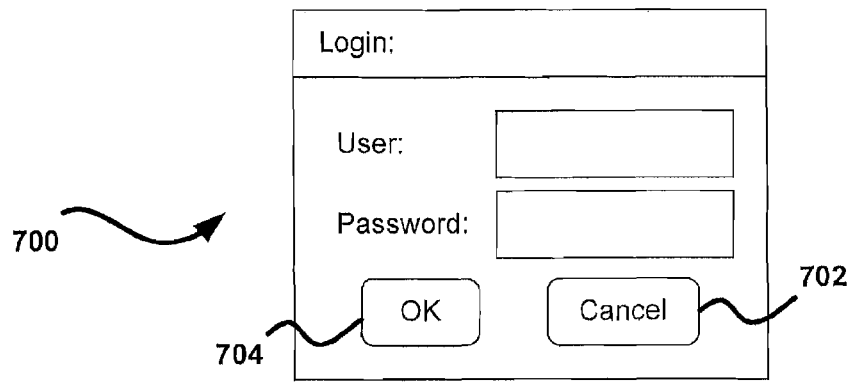
FIGS. 7A through 7F illustrate an various user interface screens of an exemplary system under test after a certain sequence of actions are taken.

FIG. 7A illustrates an application login dialog 700 for an exemplary application that is to be tested with state driven testing. After starting the exemplary application the login dialog is the first choice presented to the user. Pressing the Cancel button 702 will exit the application. Specifying "User", "Password", and pressing the OK button 704 will bring up the main window of the application.

Figure 7B:
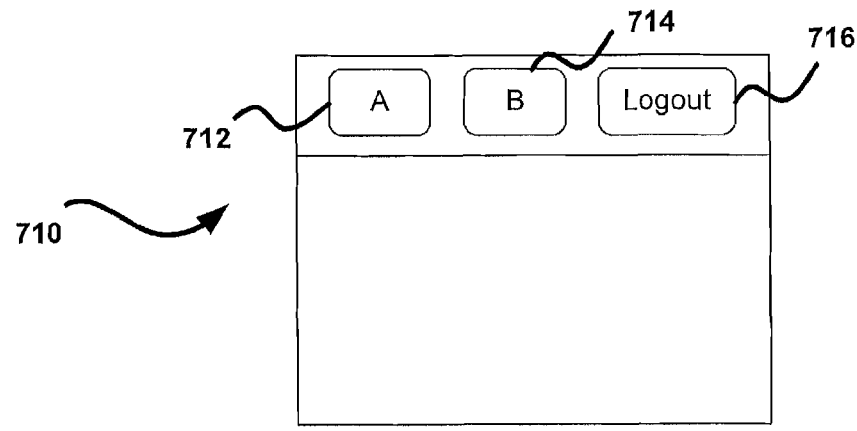

FIG. 7B illustrates the main window 710 for the exemplary application under test after logging in. In the main window, pressing the A button 712 opens the grid pane displaying order data ("A-Grid"). Pressing the B button 714 opens the grid pane displaying order item data ("B-Grid"). Pressing the Logout button 716 logs the user out and displays the login dialog 700.

Figure 7C:
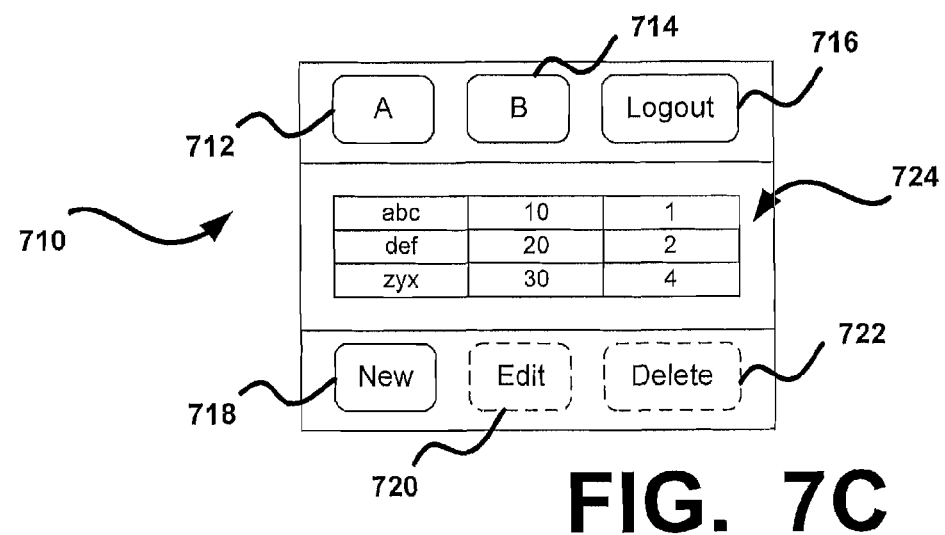

FIG. 7C illustrates the main window 710 for the exemplary application under test after the A button 712 was pressed. Pressing the A button 712 opened up a grid pane 724 with three columns and also displayed the New button 718, the Edit button 720 and the Delete button 722. The Edit button 720 and the Delete button 722 are disabled as long as no row is selected.

Figure 7D:
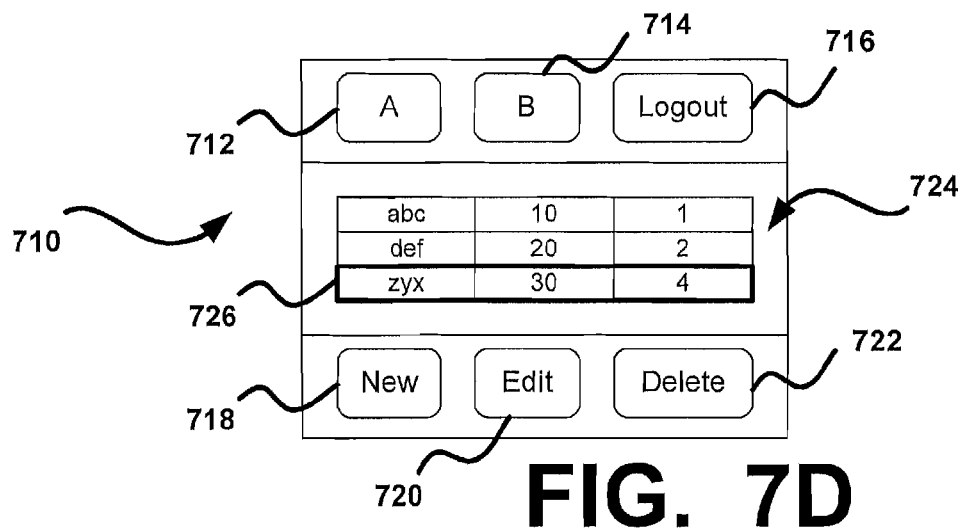

FIG. 7D illustrates the main window 710 for the exemplary application under test after a row 726 in the grid pane 724 was selected. The Edit button 720 and the Delete button 722 are enabled as a result of selecting the row 726.

Figure 7E:
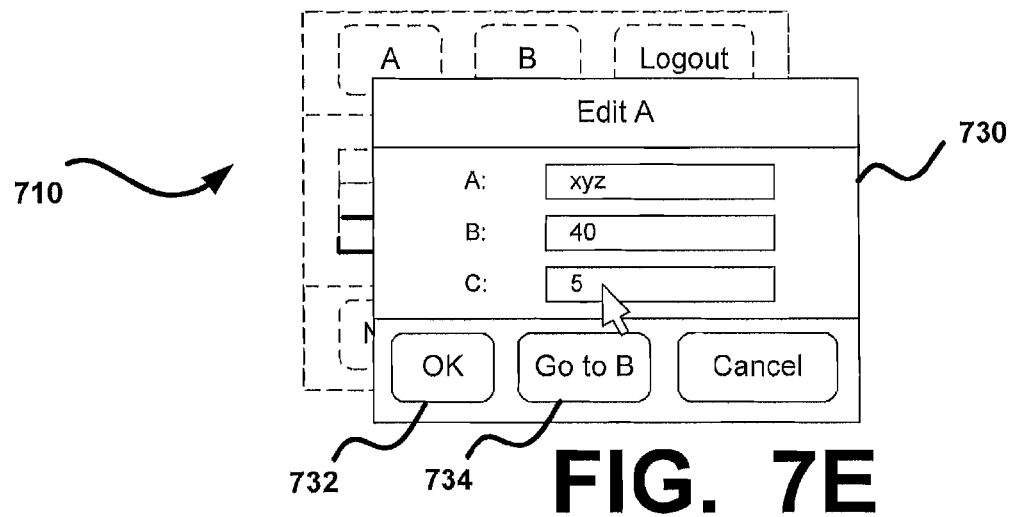

FIG. 7E illustrates a modal dialog 730 that was created as a result of pressing the Edit button 720. Pressing the OK button 732 saves the changes and goes back to the grid pane for A. Pressing the Go to B button 734 saves the changes and goes to the grid for B.

Figure 7F:
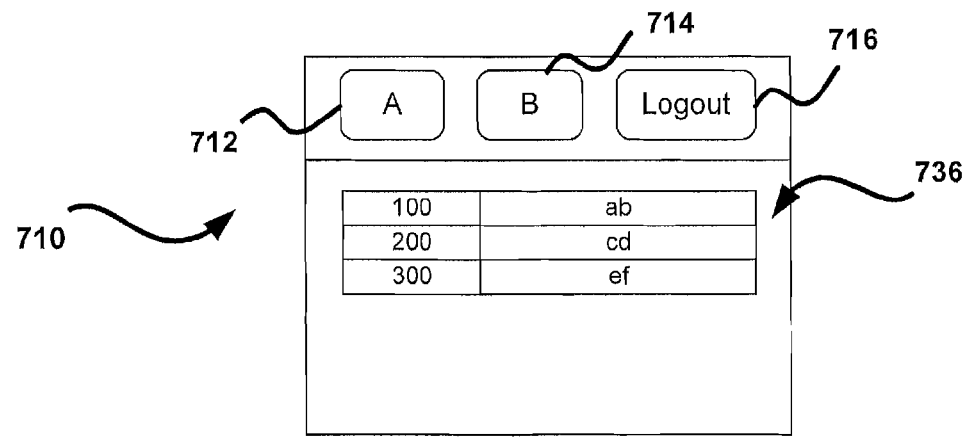

FIG. 7F illustrates the main window 710 for the exemplary application under test displaying a grid pane 736 with B-Grid data.

Figure 8:
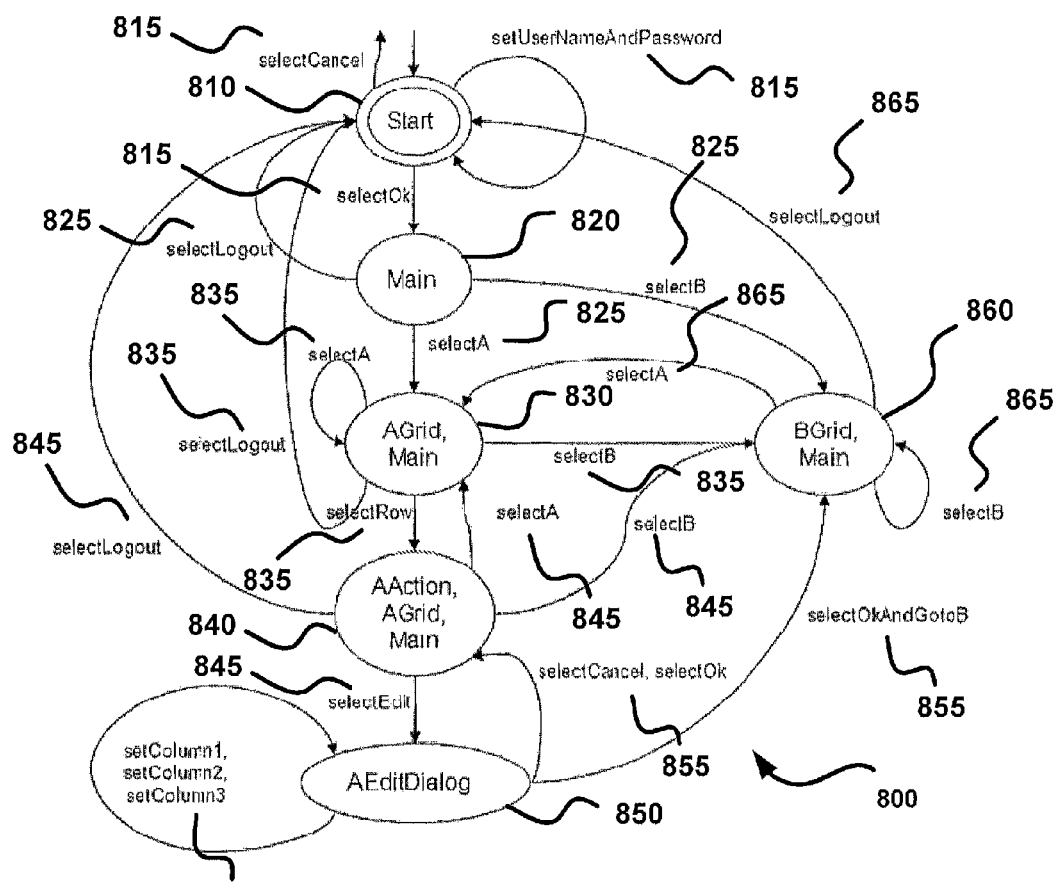
FIG. 8 illustrates a state diagram for navigating the state transitions for the exemplary application described in FIGS. 7A-7F.

FIG. 8 illustrates an improved state diagram 800 for navigating the state transitions for the exemplary application described in FIGS. 7A-7F. Six application states 810, 820, 830, 840, 850 and 860 are depicted and each is described by the test objects available at that point in the navigation of the SUT. Each application state has an associated set of test objects with its test methods 815, 825, 835, 845, 855, 865 that are accessible for that state. The application states and their associated test objects are described in detail below.

Figure 9A:
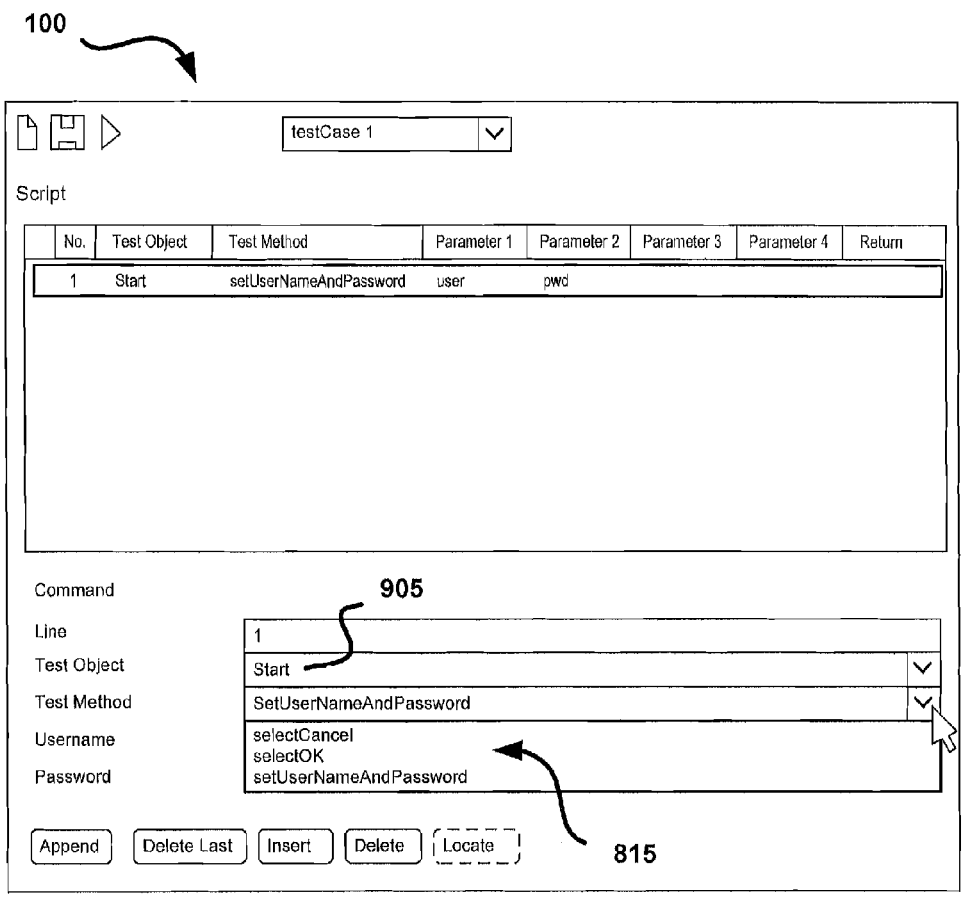

FIG. 9A illustrates the exemplary test script editor 100 starting a test script for the exemplary application described in FIGS. 7A-7F and 8. When working with the test framework for the exemplary application the first available test object is the Start object 905. Within the Start object 905 the user can choose from the available test methods 815 selectOk, select-Cancel, and setUserNameAndPassword. The application state is described in the improved state diagram 800 in FIG. 8 with the Start state 810.

Figure 9B:

FIG. 9B illustrates the exemplary test script editor 100 after the action Start.setUserNameAndPassword is completed. The state transition associated with the test method setUserNameAndPassword is the Start state 810. Since the application state was already in the Start state 810 no state change occurred, The same set of test objects and test methods that was accessible for step one is also accessible for step two. Accordingly, a test method's "state transition" does not always result in a changed state; it merely identifies the state of the application after the test method is executed.

Figure 9C:
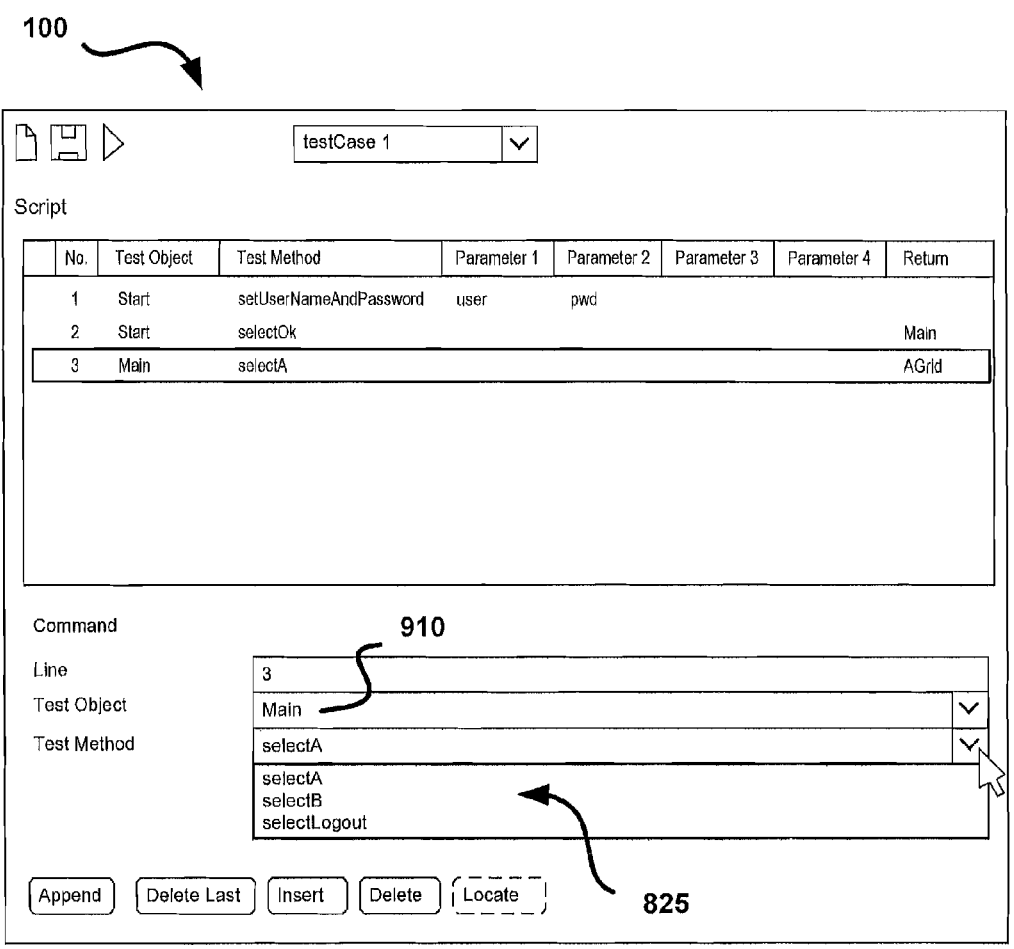

FIG. 9C illustrates the exemplary test script editor 100 after the action Start.selectOK is completed, which caused the application state to change and made the Main object 910 accessible. Within the Main object 910 the user can choose from available test methods 825 selectA, selectB, and selectLogout. The application state is described in the improved state diagram 800 in FIG. 8 with the Main state 820.

Figure 9D:
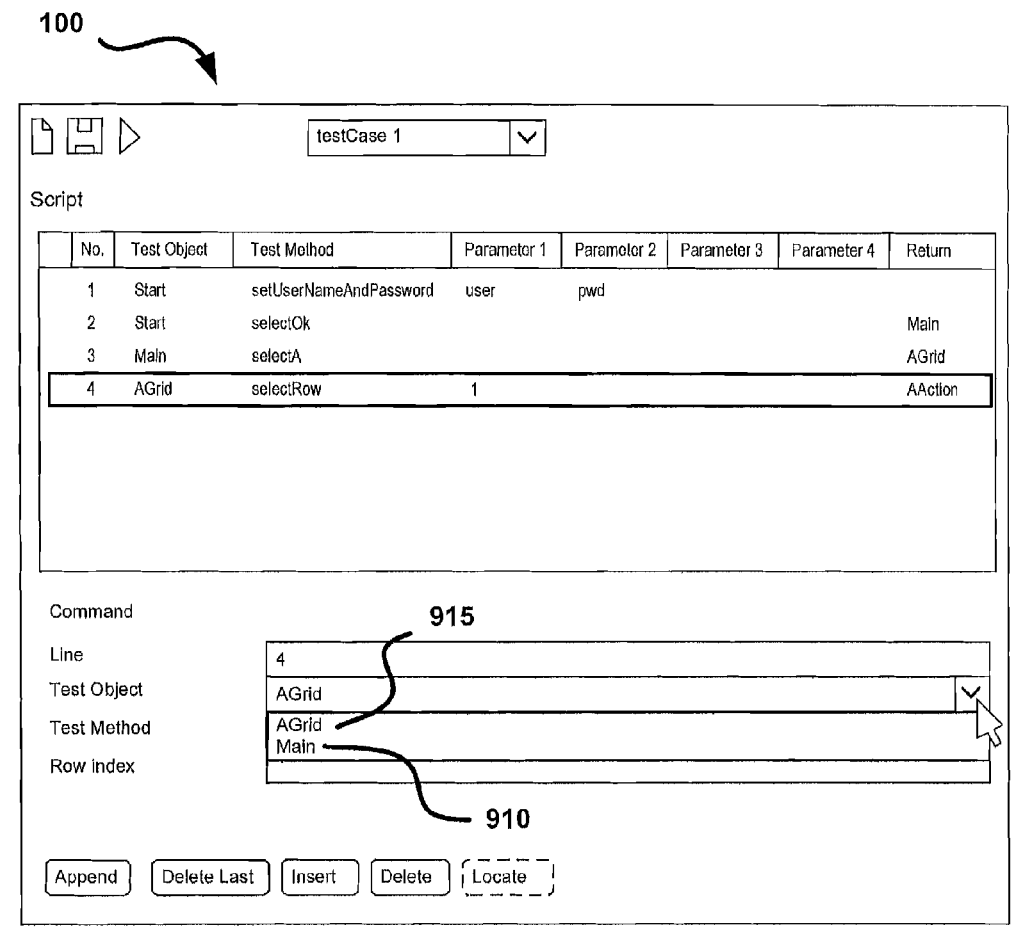

FIG. 9D illustrates the exemplary test script editor 100 after the action Main.selectA is completed, which caused the application state to change and made both the AGrid object 915 and the Main object 910 available for step four. Together, the two objects 910 and 915 represent the application state, and are described in the improved state diagram 800 in FIG. 8 with the AGrid, Main state 830. Although FIG. 8 does not distinguish between the two test objects, the available test methods 835 are associated with the specific test object. Accordingly, within the Main object 910 the user can choose from available test methods selectA, selectB, and selectLogout and within the AGrid object 915 the user can choose from available test method selectRow.

Figure 9E:
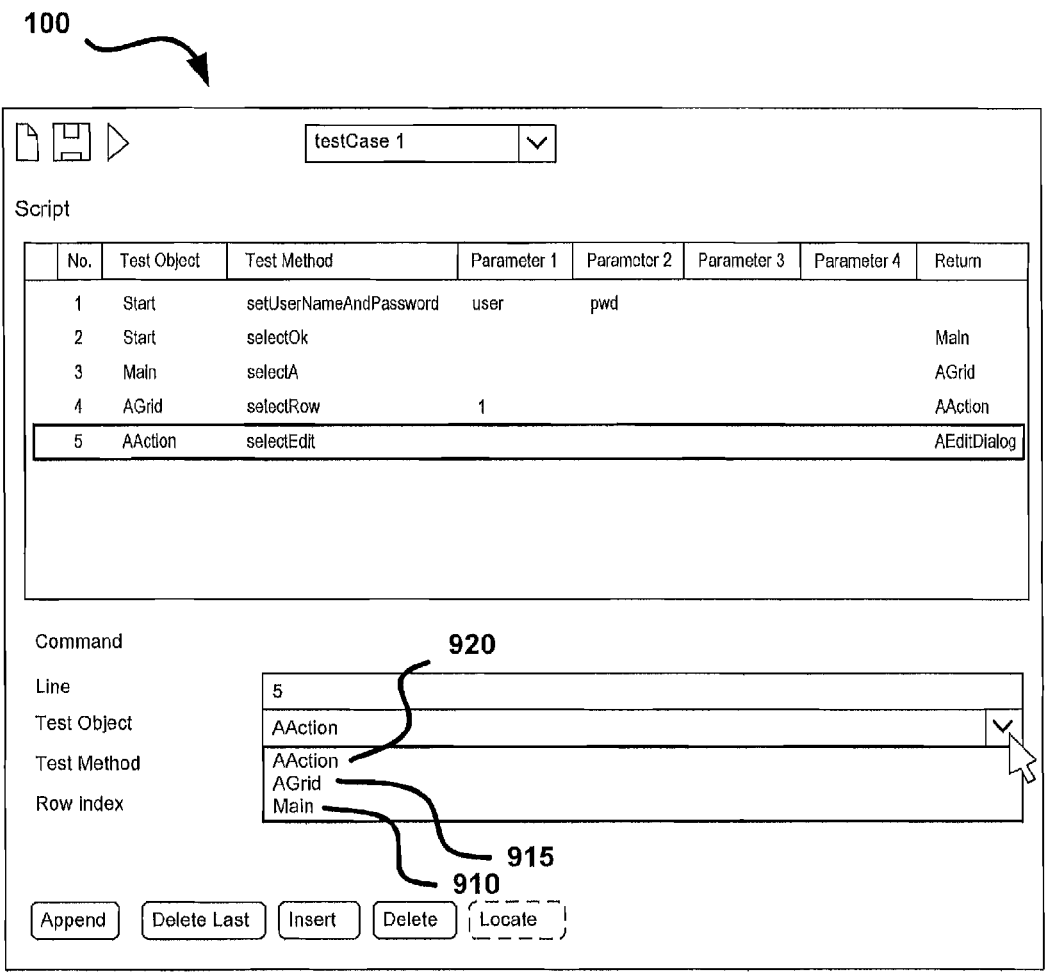

FIG. 9E illustrates the exemplary test script editor 100 after the action AGrid.selectRow is completed, which caused the application state to change and made the AAction object 920, the AGrid object 915 and the Main object 910 available for step five. Together, the three objects represent the application state, and are described in the improved state diagram 800 in FIG. 8 with the AAction, AGrid, Main state 840. As previously described, only certain test methods are available in connection with certain test objects. As before, within the Main object 910 the user can choose from available test methods selectA, selectB, and selectLogout and within the AGrid object the user can choose from available test method selectRow. The new test object AAction also allows the user to choose from available test method selectEdit.

Figure 9F:

FIG. 9F illustrates the exemplary test script editor 100 after the action AAction.selectEdit is completed, which caused the application state to change and made the AEditDialog object 925 accessible for step six. Within the AEditDialog object 925 the user can choose from available test methods 855 selectCancel, selectOK, selectOkAndGotoB, setColumn1, setColumn2 and setColumn3. The application state is described in the improved state diagram 800 in FIG. 8 with the Main state 850.

Figure 9G:
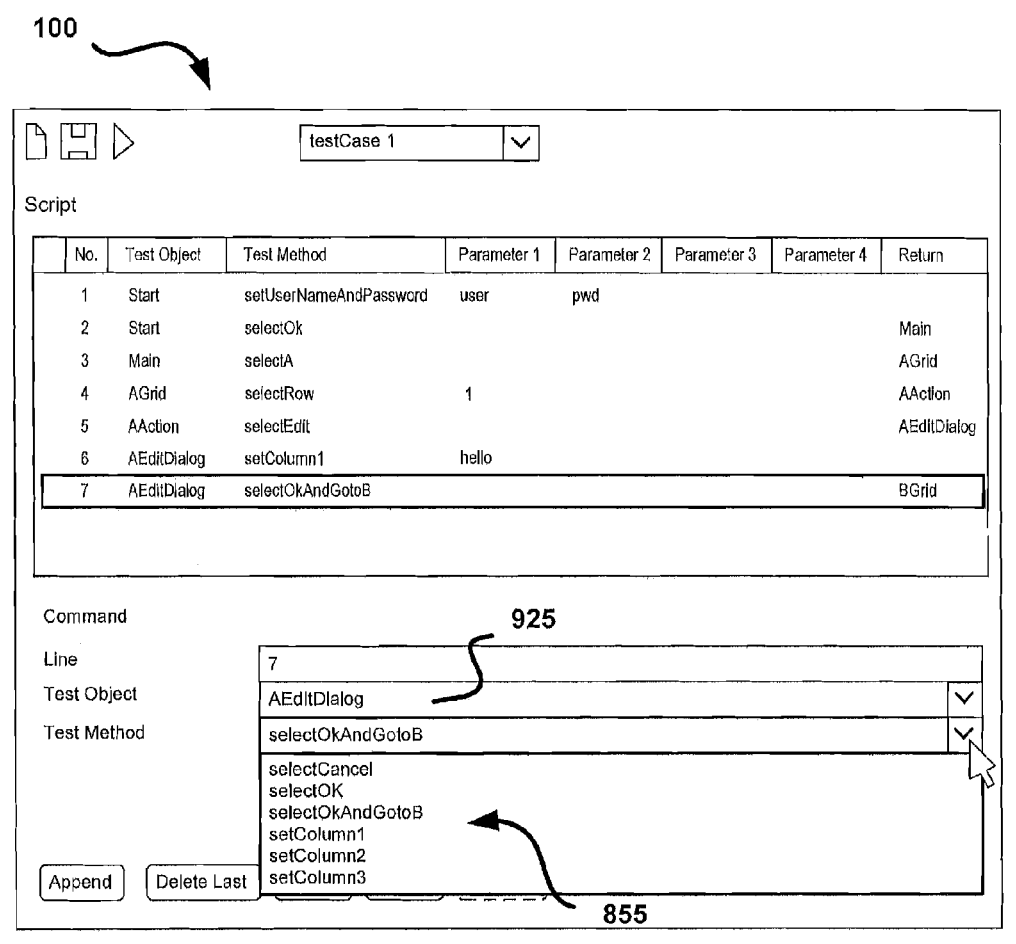

FIG. 9G illustrates the exemplary test script editor 100 after the action AEditDialog.setColumn1 is completed. Since no state change occurred, the same set of test objects and test methods that was accessible for step six is also accessible for step seven.

Figure 9H:
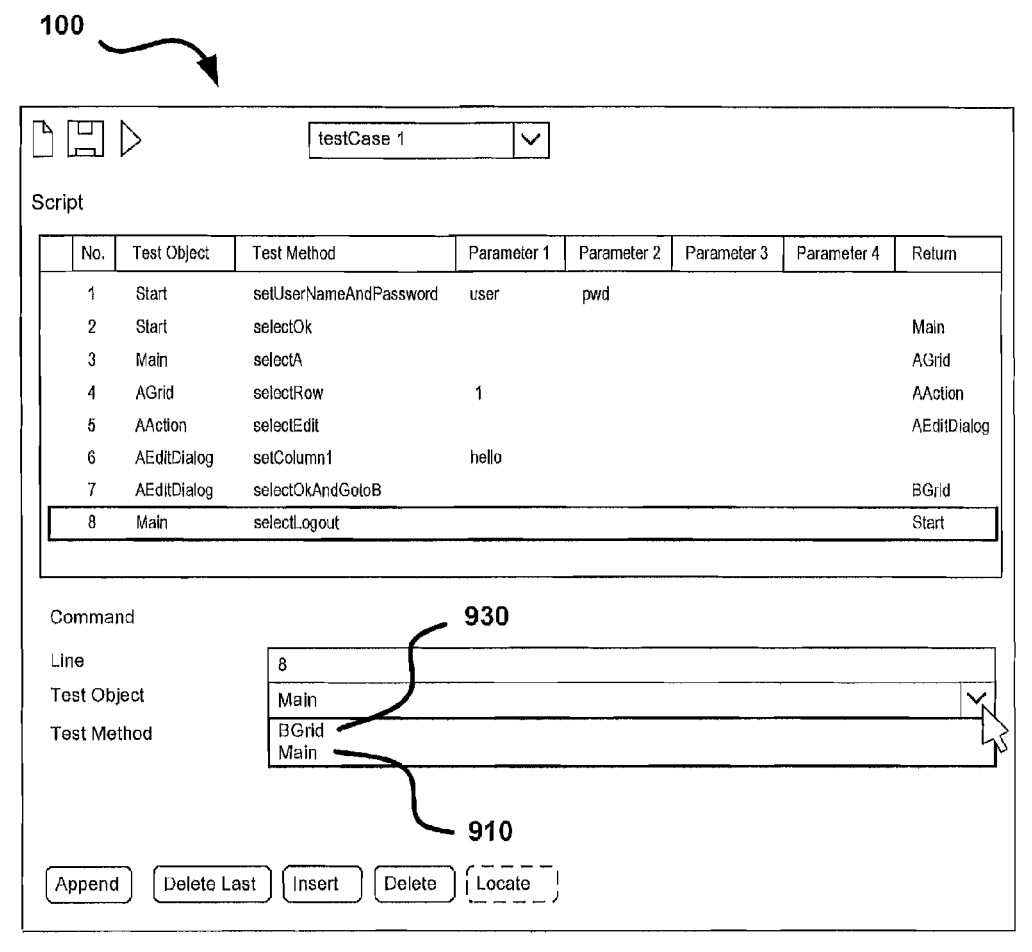

FIG. 9H illustrates the exemplary test script editor 100 after the action AEditDialog.selectOkAndGotoB is completed, which caused the application state to change and made both the BGrid object 930 and the Main object 910 available for step eight. The application state is described in the improved state diagram 800 in FIG. 8 with the BGrid, Main state 860.

Figure 10:
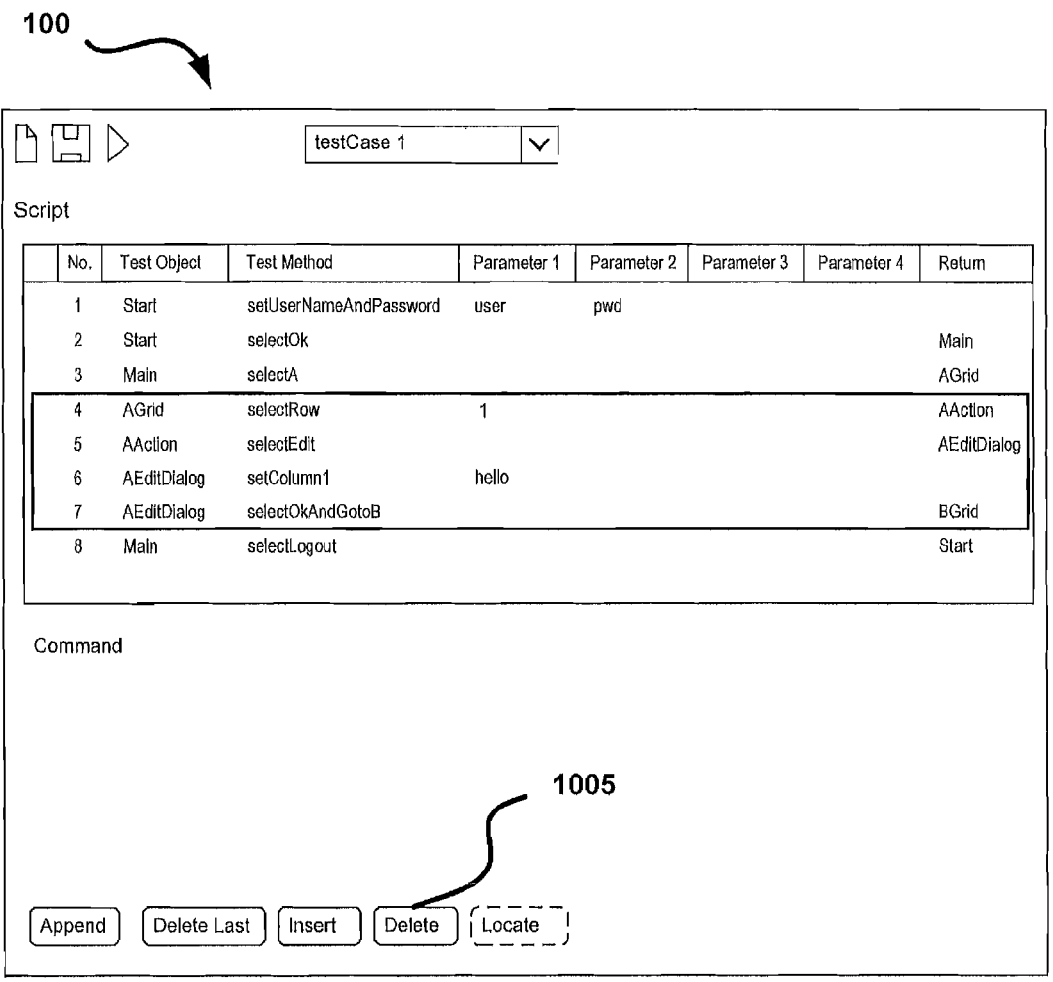
FIG. 10 illustrates the exemplary test script editor of FIG. 1 when steps four through seven are selected.

FIG. 10 illustrates the exemplary test script editor 100 when steps four through seven are selected. Since the delete button 1005 is enabled, the test object in step eight ("Main") is reachable through state transitions of steps one, two, three and eight. In other words, step eight can be integrated with step three.

FIG. 11 illustrates the exemplary test script editor 100 when steps four through six are selected. Since the delete button 1005 is disabled, the test object in a step subsequent to step six (in this case, step seven, "AEditDialog") is not reachable. A modified test script of steps one, two, three, and seven has lost its integrity and step seven cannot be integrated with step three.

FIG. 12A illustrates an exemplary notation 1200 using a Domain Specific Language for indicating the test framework using a state stack for state transitions. StartObject 1210 defines the test object(s) which are available after starting the application. StateTransition 1220 defines the state transitions for a test method. Multiple calls to state transitions methods (e.g., AddAppState, NewAppState, SetAppState, RestoreAppState, RemoveAppState) can be listed to define a state transition. The state transition for the test method selectOkAndGotoB 1230 removes the current application state from the stack to express that the modal dialog 730 ("AEditDialog") is closed and sets the current application state to the previous state. It also removes the test objects AAction and AGrid from the new current state to express that the A-Grid and its actions are not available and adds the test object BGrid to the current application state to express that the B-Grid is now accessible. Alternatively the following (simpler) state transition can be used to express the same state transition: StateTransition: RestoreAppState, SetAppState(BGrid). In one embodiment, specifying more than one state transition for a test method will not cause those state transitions to be executed in the order specified, but instead in the following order: (1) RestoreAppState, (2) SetAppState, (3) AddAppState, (4) RemoveAppState, and (5) NewAppState.

FIG. 12B illustrates an exemplary test framework 1240 using a state stack for state transitions using an inline definition of state transitions using Java annotations.

FIG. 12C illustrates an exemplary test framework 1250 using a state stack for state transitions using an inline definition of state transitions using Net attributes.

FIGS. 12D and 12E illustrate an exemplary test framework 1260 and 1261 using a state stack for state transitions using an external definition of a state transition model through XML. By using an external XML notion with references to the implementation of test methods the test framework 1260 and 1261 can be easily applied to test frameworks written in programming languages that provides an external call-level interface (e.g., C-DLLs, COM interface, .NET assembly, Java class file).

Those skilled in the art will appreciate that by providing a state transition model that uses a state stack to define and maintain state transitions as part of the actions (expressed through test objects and test methods) of the system solves the problem of state and transition explosion in a very effective and simple way.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, schema, or techniques, including, but not limited to, VB, C, Objective C, C++, C#, Java™, Javascript™, COBOL, XML, MXML, PHP, and others. The described techniques may be varied and are not limited to the examples or descriptions provided.

Figure 13:
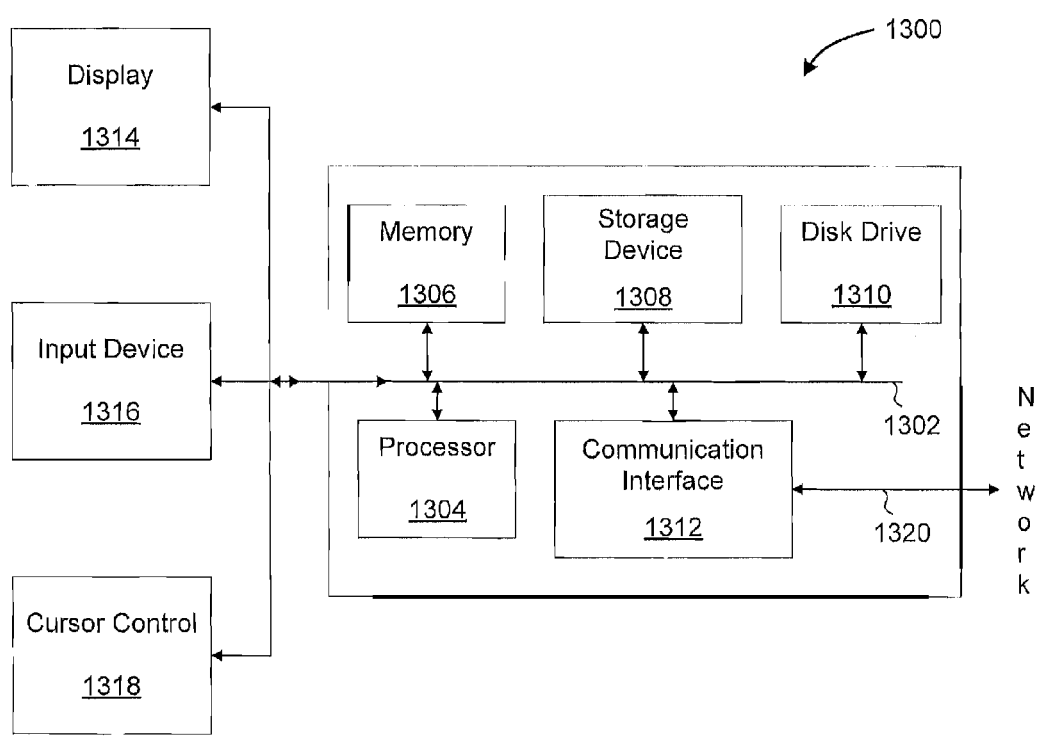
FIG. 13 illustrates an exemplary computer system suitable for testing software.

FIG. 13 illustrates an exemplary computer system suitable for disk storage performance using digital memory and data compression. In some examples, computer system 1300 may be used to implement computer programs, applications, methods, processes, or other software to perform the above-described techniques. Computer system 1300 includes a bus 1302 or other communication mechanism for communicating information, which interconnects subsystems and devices, such as processor 1304, system memory 1306 (e.g., RAM), storage device 1308 (e.g., ROM), disk drive 1310 (e.g., magnetic or optical), communication interface 1312 (e.g., modem or Ethernet card), display 1314 (e.g., CRT or LCD), input device 1316 (e.g., keyboard), and cursor control 1318 (e.g., mouse or trackball).

According to some examples, computer system 1300 performs specific operations by processor 1304 (which may include a plurality of processors) executing one or more sequences of one or more instructions stored in system memory 1306. Such instructions may be read into system memory 1306 from another computer readable medium, such as static storage device 1308 or disk drive 1310. In some examples, hard-wired circuitry may be used in place of or in combination with software instructions for implementation.

The term "computer readable medium" refers to any tangible medium that participates in providing instructions to processor 1304 for execution, Such a medium may take many forms, including but not limited to, non-volatile media and volatile media, Non-volatile media includes, for example, optical or magnetic disks, such as disk drive 1310. Volatile media includes dynamic memory, such as system memory 1306. In some examples, a single apparatus (i.e., device, machine, system, or the like) may include both flash and hard disk-based storage facilities (e.g., solid state drives (SSD), hard disk drives (HDD), or others). In other examples, multiple, disparate (i.e., separate) storage facilities in different apparatus may be used. Further, the techniques described herein may be used with any type of digital memory without limitation or restriction. The described techniques may be varied and are not limited to the examples or descriptions provided.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1302 for transmitting a computer data signal.

In some examples, execution of the sequences of instructions may be performed by a single computer system 1300. According to some examples, two or more computer systems 1300 coupled by communication link 1320 (e.g., LAN, PSTN, or wireless network) may perform the sequence of instructions in coordination with one another. Computer system 1300 may transmit and receive messages, data, and instructions, including program, i.e., application code, through communication link 1320 and communication interface 1312. Received program code may be executed by processor 1304 as it is received, and/or stored in disk drive 1310, or other non-volatile storage for later execution.

Figure 14:
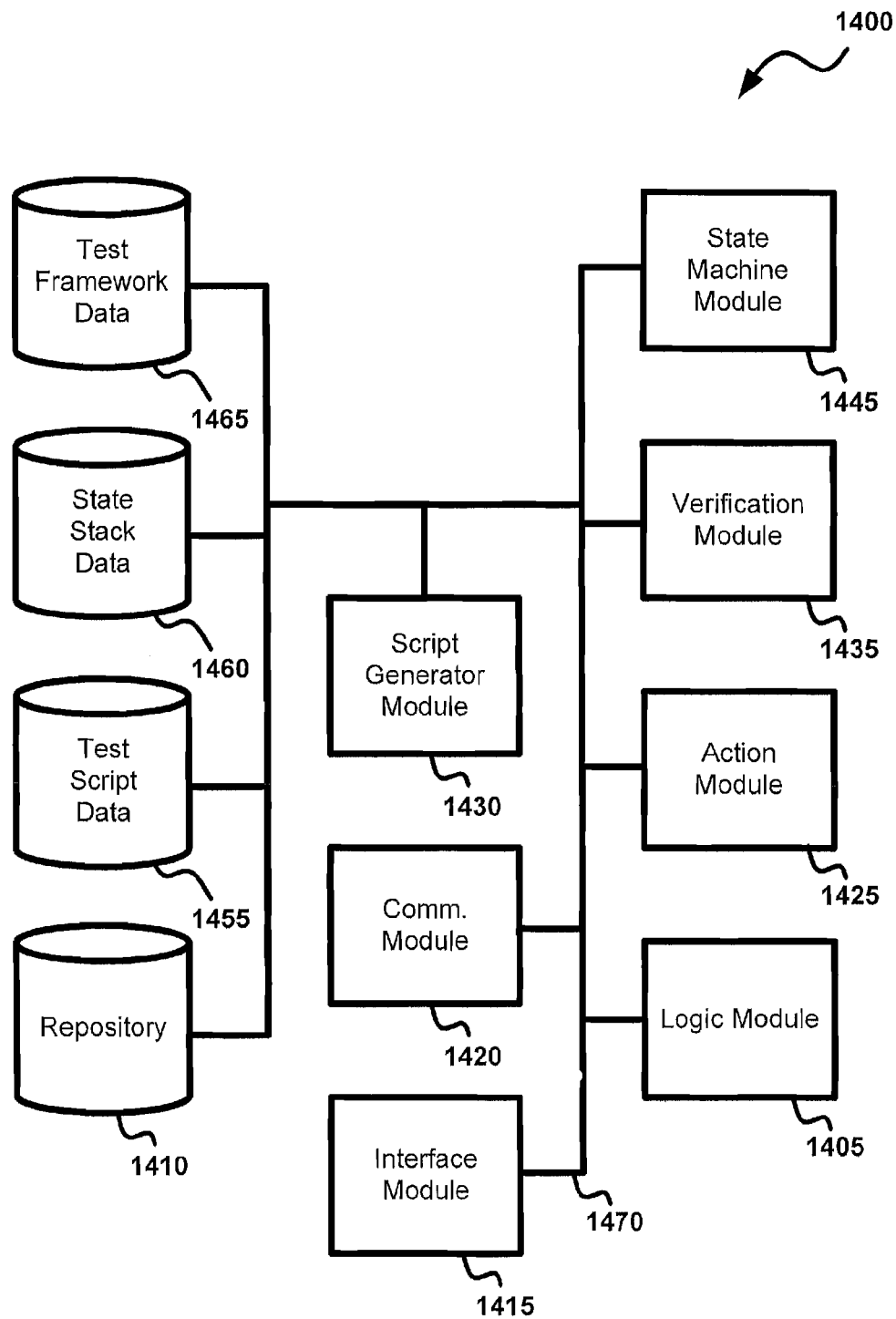
FIG. 14 illustrates an exemplary platform for generating test scripts.

FIG. 14 illustrates an exemplary platform 1400 for generating test scripts. Platform 1400 includes logic module 1405, repository 1410, interface module 1415, communications module 1420, action module 1425, script generator module 1430, verification module 1435, state machine module 1445, test script data 1455, state stack data 1460, test framework data 1465, and bus 1470. Platform 1400 illustrates a block modular architecture of an application configured to perform the described techniques. Logic module 1405 may be implemented as logic configured to generate control signals to repository 1410, interface module 1415, communications module 1420, action module 1425, script generator module 1430, verification module 1435, state machine module 1445, test script data 1455, state stack data 1460, test framework data 1465, and bus 1470. Logic module 1405 may be implemented as a module, function, subroutine, function set, rule set, or other type of software, hardware, circuitry, or combination that enables control of application 1400 and the described elements.

As shown, repository 1410 may be implemented as a single, multiple-instance, standalone, distributed, or other type of data storage facility, similar to those described above in connection with FIG. 13. In other examples, repository 1410 may also be implemented partially or completely as a local storage facility for data operated upon by platform 1400 and the described elements. In other examples, repository 1410 may be a remote data storage facility that is used to provide storage for platform 1400. Still further, some or all of repository 1410 may be used to provide a cache or queue for one or more of the elements shown for platform 1400. Although test framework data 1465, state stack data 1460, and test script data 1455 are depicted for ease of understanding as separate from repository 1410, they may all be part of the same data storage facility.

Interface module 1415 may be implemented to utilize input/output devices. In some examples, an input may be a graphical, visual, or iconic representation displayed on a computer screen that, when selected using an input/output device (e.g., mouse, keyboard, or others) indicates an item (e.g., data structure (e.g., table, record, file, queue, or others), function (e.g., pull down menu, pop-up window, or others), feature (e.g., radio button, text box, form, or others)) or type of item that should be included in an application. FIGS. 9-11 are an example of screens that interface module 1415 can displayed to a user.

In some examples, communications module 1420 may be configured to send and receive data from platform 1400. For example, platform 1400 may be implemented on one or more remote servers and, when a message (e.g., data packet) is received from a remote client over a data network (e.g., network of FIG. 13), communications module 1420 receives, decodes, or otherwise interprets data from the message and transmits the data over bus 1470. Some implementations may have the actual testing of the SUT be performed remotely and the communications module 1420 ensures the final test script is sent to the remote server testing the SUT. In such an implementation, the business analysts responsible for using the platform 1400 and performing the navigations that generate the test scripts may be segregated from the actual coders responsible for the SUT.

In one embodiment, action module 1425 analyzes data from the test framework data 1465, the state stack data 1460, and a user's input from the interface module 1415 in order to determine which test methods are accessible from a selected test objects in the current state. State stack data 1460 keeps track of the current state and is modified as the application is used. Test framework data 1465 represents the collection of all test objects, test methods, and state transitions, including their various relationships. For example, each test method is associated with a single test object. Similarly, in one embodiment, each test method is associated with a potential state transition (whether a test method results in an actual state transition depends on the current state of the SUT). If the current state has multiple test objects, then in one embodiment the user must select one test object in order to view the accessible test methods for the selected test object. Test framework data 1465 can be created individually or collaboratively by coders of the SUT and business analysts.

The verification module 1435 uses the state machine module 1445 to test modifications proposed by a user through the interface module 1415 and ensures the user is not proposing a broken state transition where one state is not reachable through prior test object/test method choices. The verification module 1435 can also work with the action module 1425 to: propose test objects and test methods when an action is to be inserted within the test script, identify test objects and test methods that can be altered, and identify actions that can be deleted. The verification module 1435 ensures that script integrity is maintained for any modifications to the test script.

Script generator module 1430 updates the test script from the test script data 1455 and a user's navigation, received as inputs from the interface module 1415. The test script is output to the test script data 1455.

State machine module 1445 additionally uses the state stack data 1460 and inputs from either the verification module 1435 or the interface module 1415 to update the state stack data 1460.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A system comprising:
   a memory configured to store application states, test objects, test methods, and their relationships;
   an action module configured to generate a subset of accessible test methods from a test object selection, the subset being determined by the relationship between the test methods, the test objects and the application states; and
   a script generator module configured to generate a test script in response to a test method selection from the subset of accessible test methods.

2. The system of claim 1, further comprising:
   a state machine module configured to modify an application state stack in response to the selection of test methods, wherein the memory is further configured to maintain an application state stack.

3. The system of claim 2, wherein each state in the state stack includes accessible test objects.

4. The system of claim 2, wherein each test method is associated with state whereby a test method selection results in a potential state transition.

5. The system of claim 1, further comprising an interface module that is configured to receive the test method selection.

6. The system of claim 1, further comprising a verification module that is configured to ensure script integrity is maintained for any modifications to the test script.

7. The system of claim 6, wherein the modifications to the test script can include appending an action to the end of the test script, inserting an action within the test script, deleting an action from the test script and altering an action within the test script.

8. A system comprising:
   a memory configured to store application states, test objects and test methods and their relationships; and
   a verification module that is configured to check the integrity of a modification to the test script, the integrity being determined by the relationship between the test methods, the test objects and the application states; and
   a script generator module configured to generate a test scripts.

9. The system of claim 8, further comprising:
   a state machine module configured to modify an application state stack in response to a selection of a test method,
   wherein the memory is further configured to maintain an application state stack.

10. The system of claim 9, wherein each state in the state stack includes accessible test objects.

11. The system of claim 9, wherein each test method is associated with state whereby a test method selection results in a potential state transition.

12. The system of claim 8, further comprising an interface module that is configured to receive the test method selection.

13. The system of claim 8, wherein the modifications to the test script can include appending an action to the end of the test script, inserting an action within the test script, deleting an action from the test script and altering an action within the test script.

14. A system comprising:
   a memory configured to store application states, a state stack, test objects and test methods, wherein the application state includes a first set of test objects, the test methods can be associated with one or more state transitions, and each test method is associated with one test object;
   a state machine module configured to modify an application state stack in response to a selection of a test method;
   a verification module that is configured to check the integrity of a modification to the test script, the integrity being determined by the relationship between the test methods, the test objects and the application states; and
   a script generator module configured to generate a test scripts.

15. The system of claim 14, further comprising an action module configured to generate a subset of accessible test methods from a test object selection.

* * * * *